United States Patent [19]
Rinker, deceased et al.

[11] 3,879,938
[45] Apr. 29, 1975

[54] ROTARY ENGINE APPARATUS

[76] Inventors: Clark I. Rinker, deceased, late of San Leandro, Calif.; by Juanita S. Rinker, administratrix, 1345 Oakes Blvd., San Leandro, Calif.

[22] Filed: Jan. 12, 1973

[21] Appl. No.: 323,233

[52] U.S. Cl. ............................ 60/39.61; 123/8.49
[51] Int. Cl. .............................................. F02c 5/00
[58] Field of Search ....... 60/39.61, 39.63; 123/8.49, 123/8.25

[56] References Cited
UNITED STATES PATENTS

| | | | |
|---|---|---|---|
| 873,596 | 12/1907 | Pingret | 60/39.61 |
| 1,116,471 | 11/1914 | Neumeyer | 60/39.61 X |
| 1,229,949 | 6/1917 | Harrigan | 60/39.61 |
| 1,933,442 | 10/1933 | Maxwell | 60/39.61 X |
| 2,403,684 | 7/1946 | Rich | 60/39.61 UX |
| 2,896,409 | 7/1959 | Heiman | 60/39.61 |
| 3,701,254 | 10/1972 | Michejda | 60/39.61 |

FOREIGN PATENTS OR APPLICATIONS

| | | | |
|---|---|---|---|
| 417,342 | 11/1910 | France | 60/39.61 |

*Primary Examiner*—Clarence R. Gordon

[57] ABSTRACT

Engine apparatus operative to convert the chemical energy of a combustible fuel into mechanical energy, and useful both in propelling automotive vehicles and in other environments in which conventional internal combustion engines have utility. The engine apparatus is of the rotary type, and it includes a cylindrical drive rotor rotatably supported within an expansion chamber of greater diameter so as to define an annular space about the rotor. A thrust vane extends radially outwardly from the rotor to sweep through such annular space, and a reaction rotor sealingly cooperates with the drive rotor at one location so as to sealingly subdivide the annular space and separate inlet and exhaust openings. A combustion chamber adapted to receive combustible admixtures of fuel and air therein communicates with the annular expansion chamber through the inlet opening under the control of a rotary valve. Each combustible charge is ignited and burned within the combustion chamber, and the products of combustion are directed through the inlet opening into the expansion chamber to act against the thrust vane, and react against the reaction rotor, to impart thrust to the drive rotor.

12 Claims, 20 Drawing Figures

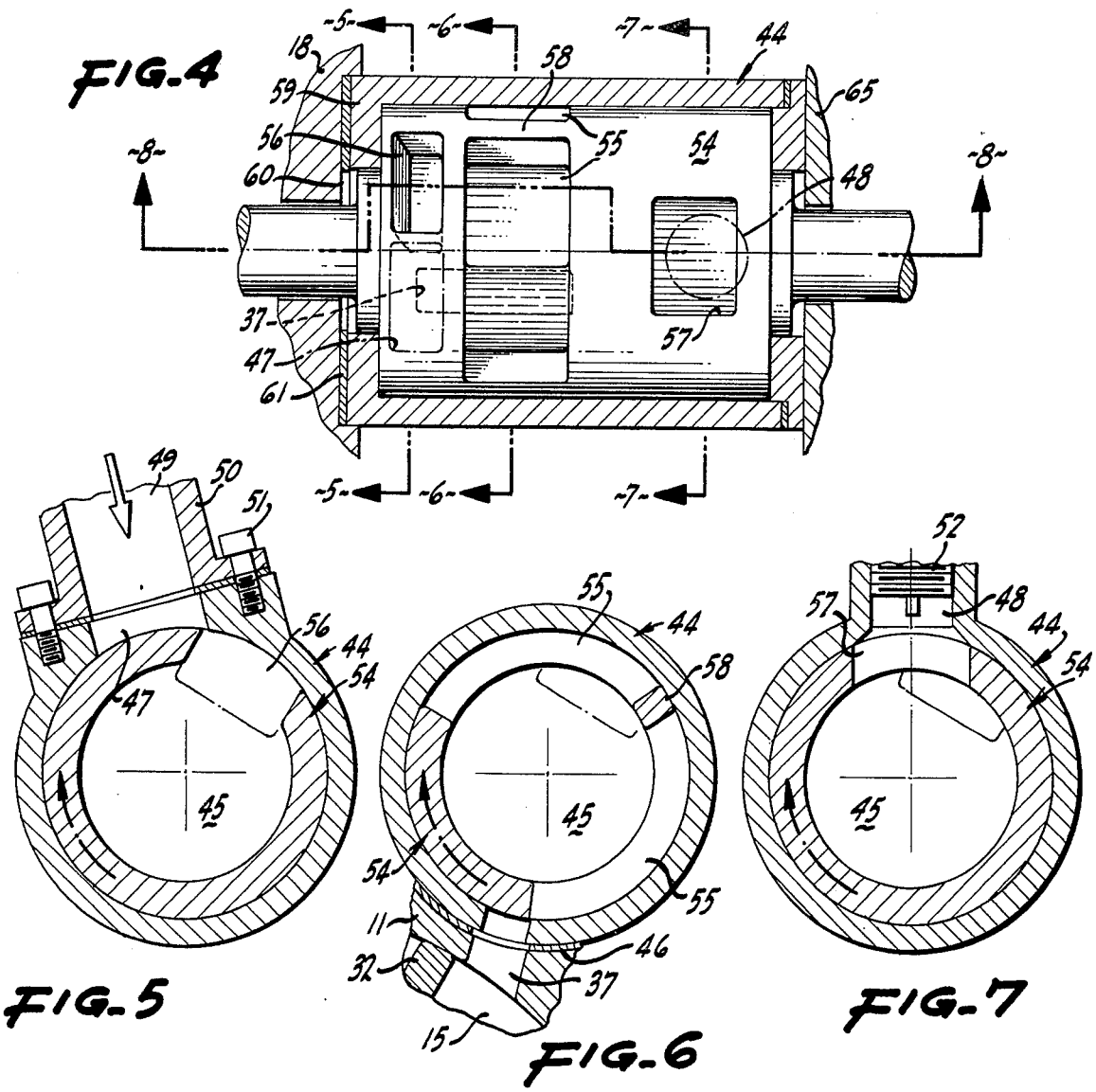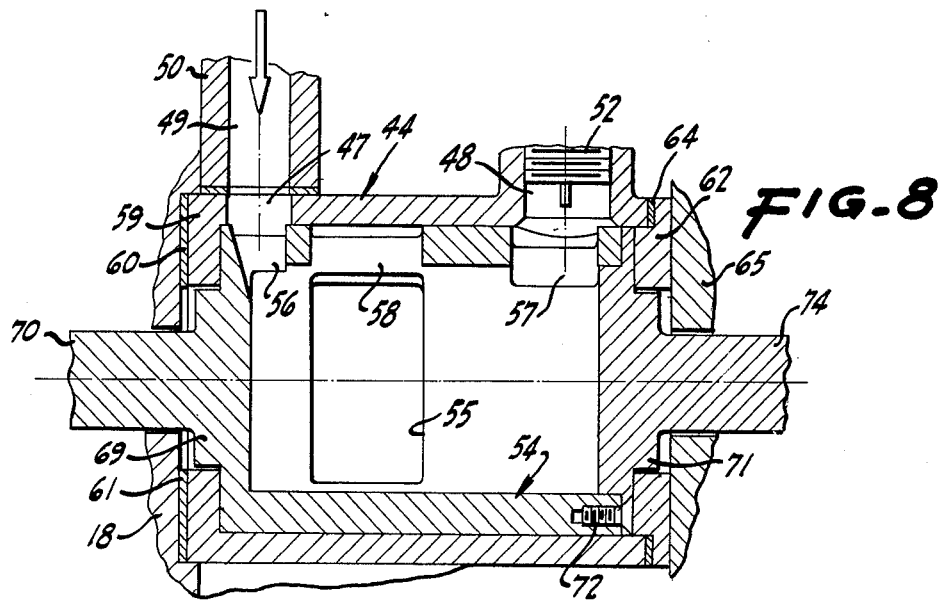

ROTARY ENGINE APPARATUS

RELATED APPLICATION

This application is related to Pat. No. 3,710,569.

DISCLOSURE

This invention relates to engine apparatus and, more particularly, to rotary engine apparatus operative to convert the chemical energy of a combustible fuel into mechanical energy and present the same as output torque. Rotary engine apparatus embodying the invention has utility in a great number of environments including essentially all of the environments in which the conventional gasoline- and diesel-type internal combustion engines are used such as to propel automotive vehicles, for example.

As explained in the aforementioned U.S. Pat. No. 3,710,569, the internal combustion engine now in prevalent use is relatively inefficient and, as a consequence, such engines are characterized by high fuel consumption and by production of considerable smog-causing pollutants, both of which are undesirable and to a considerable extent result from the manner in which such engines operate. In this reference, the combustible admixture of fuel and air is compressed within a piston-equipped cylinder, is then ignited and burned within this same cylinder, and finally is expanded therewithin to displace the piston through its power stroke. Segregation of these various operational phases into distinct or independent phases is advantageous in that it destroys the interdependency and consequent limitations on efficiency that characterize conventional reciprocating internal combustion engines.

Engine apparatus embodying the present invention continues as a recognition of the advantages of segregating the described operational phases, and carries the same into a purely rotary engine, and is directed in particular to the combustion and utilization or expansion phases. As respects the compression phase, it may be entirely independent (as explained in the aforementioned patent application), and atmospheric air may be compressed either with or without a charge of fuel admixed therewith depending upon the particular embodiment of the engine apparatus and use intended therefor. In any case, a combustible admixture of fuel and air is confined within a combustion chamber within which combustion is initiated. The resultant expansion of the products of combustion is directed from the combustion chamber into an expansion chamber to accelerate a drive rotor and thereby develop output torque.

In summary terms, rotary engine apparatus embodying the present invention includes a drive rotor that is rotatably mounted within an expansion cylinder defined by casing structure which provides angularly spaced inlet and exhaust openings communicating with such cylinder. The drive rotor is substantially smaller than the cylinder containing the same so as to provide surface areas spaced from the circumjacent walls of the cylinder and form an expansion chamber therewith. Thrust structure carried by the drive rotor extends into the expansion chamber and sweeps the same as the rotor is rotated. Pressure force reaction structure operative in leakage-inhibiting relation with the surface areas of the drive rotor separate the inlet and exhaust openings and it provides a pressurizable reaction surface against which pressure forces react while acting against the pressurizable trailing surface of the thrust structure to impart torque to the drive rotor. Valve equipped combustion chamber structure is adapted to communicate with the expansion chamber through the inlet opening, and such valve-equipped combustion chamber structure provides means for cyclically developing within the expansion chamber intermediate the thrust and reaction structures in timed relation with the angular displacements of the drive rotor a gaseous pressure charge expansible between such pressurizable surfaces to impart torque to the rotor.

A number of objects and advantages are incident to the rotary engine apparatus constituting the present invention, and as the specification continues, such objects and advantages will become apparent.

An embodiment of the invention is illustrated in the accompanying drawings, in which:

FIG. 4 is an enlarged broken longitudinal sectional view taken along the line 4—4 of FIG. 3;

Figure 1:
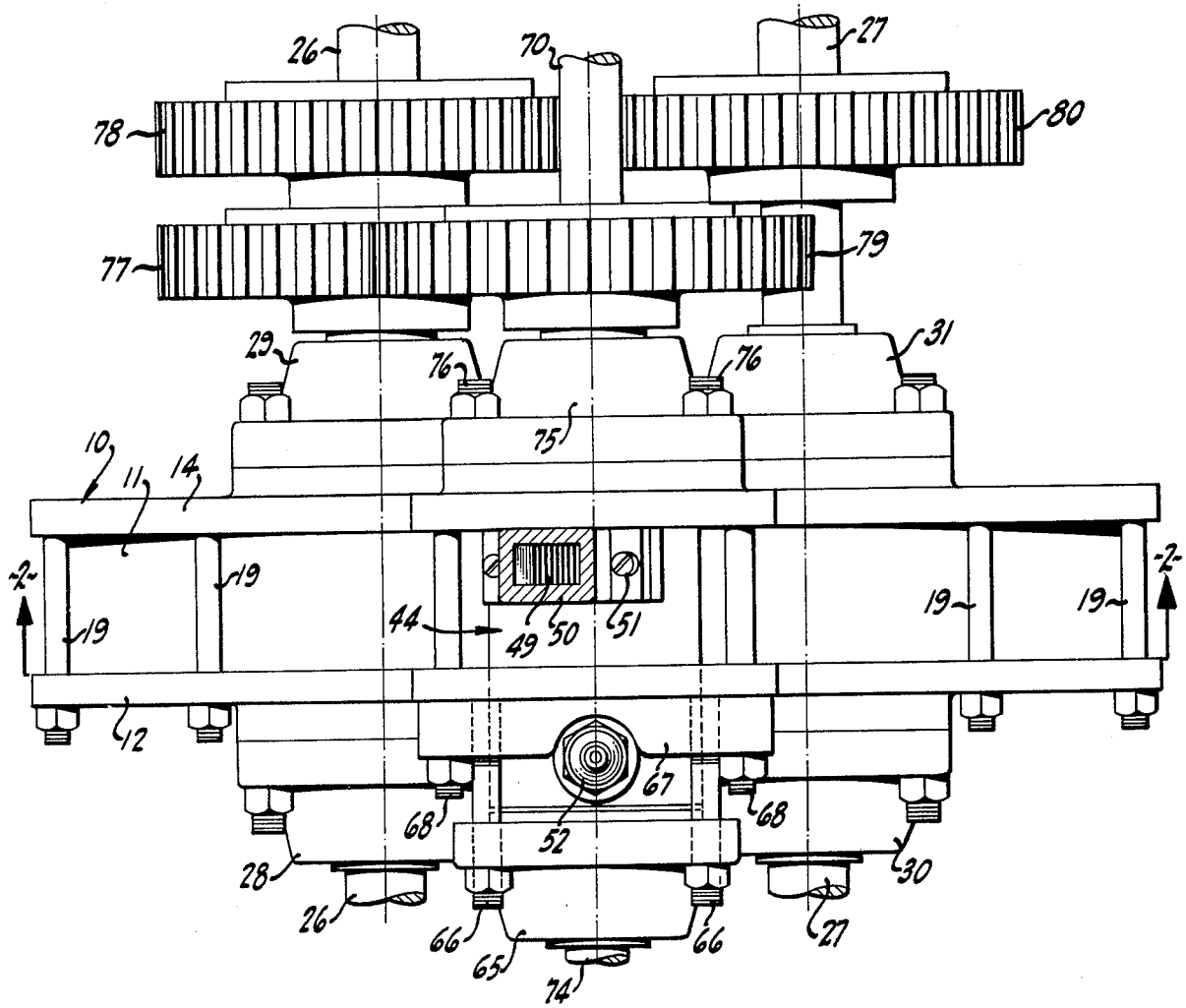
FIG. 1 is a top plan view of engine apparatus embodying the present invention.

FIGS. 5, 6, and 7 are broken transverse sectional views respectively taken along the lines 5—5, 6—6, and 7—7 of FIG. 4;

FIG. 8 is a broken longitudinal sectional view taken along the line 8—8 of FIG. 4; and FIGS. 5A through 5D, FIGS. 6A through 6D, and FIGS. 7A through 7D are diagrammatic views respectively corresponding to FIGS. 5, 6, and 7 illustrating the functional components in different operative positions thereof.

The engine apparatus illustrated in the drawings is a heat engine and, more particularly, a rotary heat engine of the spark-ignition internal-combustion type. Ordinary petroleum fuels may be used to energize the engine as, for example, regular grade gasoline. The ignition system may be conventional and timed to energize the standard spark plug or spark-ignition device at proper intervals in the cyclic operation of the engine. Similarly, conventional systems may be used to supply combustible admixtures of fuel and air to the combustion chamber of the engine. Since neither the ignition nor fuel systems are in themselves pertinent to the present invention, the details of each have been omitted for purposes of simplification.

The engine apparatus includes a casing denoted in its entirety with the numeral 10, three of the main components thereof being a cylinder-defining element 11 (see FIGS. 1 and 2), and end closure plates 12 and 14 confining the element 11 therebetween. The casing element 11 has a somewhat 8-shaped configuration defining expansion and reaction cylinders 15 and 16 therewithin, and the element 11 seats outwardly against lips 17 and 18 respectively provided by the casing plates 12 and 14, as shown in FIG. 3. The plates 12 and 14 clamp the element 11 therebetween by means of a plurality of spaced apart stud-and-bolt fasteners 19. The plates 12 and 14 adjacent the lower edges thereof are respectively equipped with L-shaped channels 20 and 21 defining a base for the engine apparatus. The base components 20 and 21 may be secured to the casing plates 12 and 14 by a plurality of nut-and-bolt fasteners 22.

Figure 2:
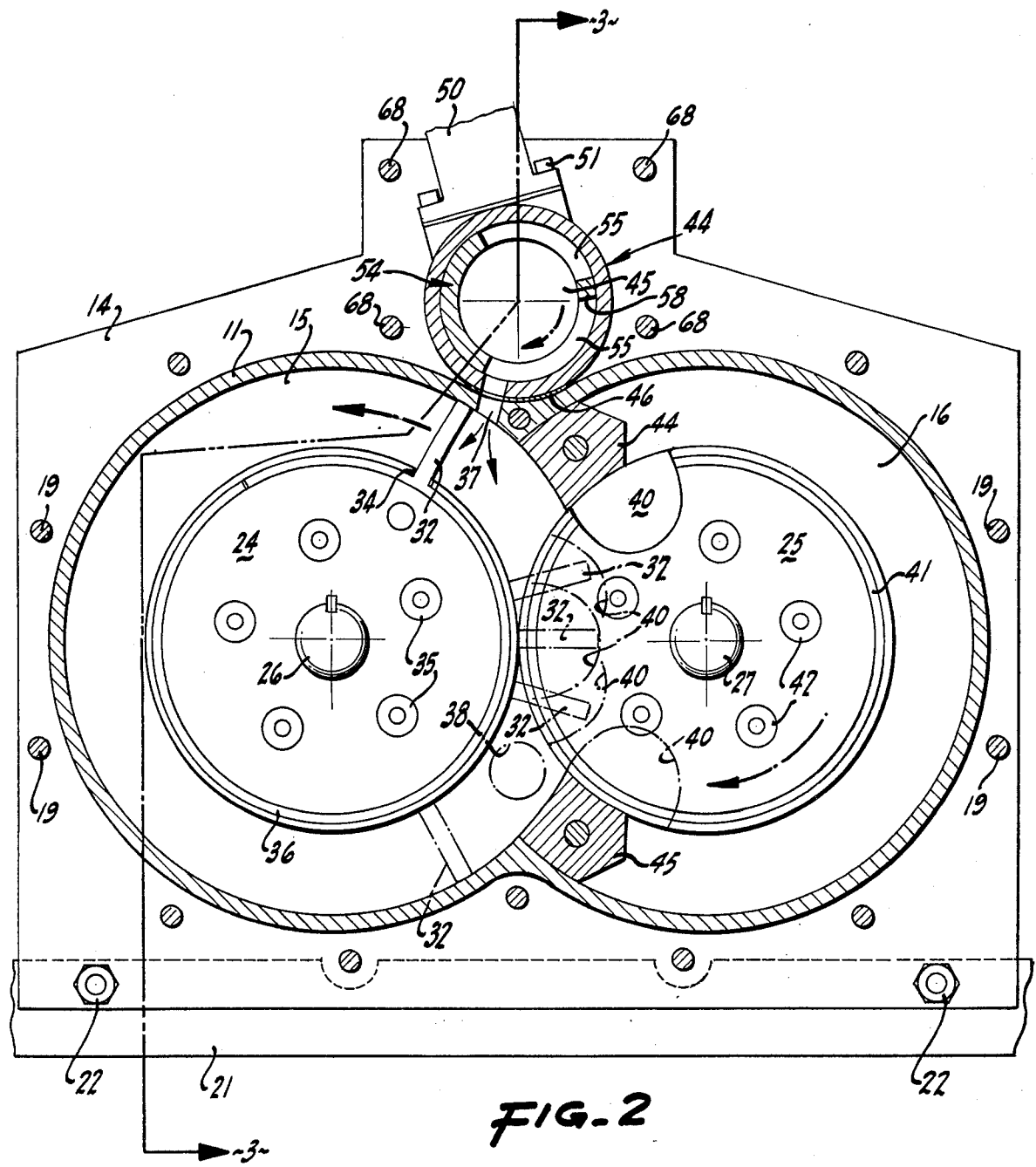
FIG. 2 is a transverse sectional view taken along the line 2—2 of FIG. 1.
Figure 3:
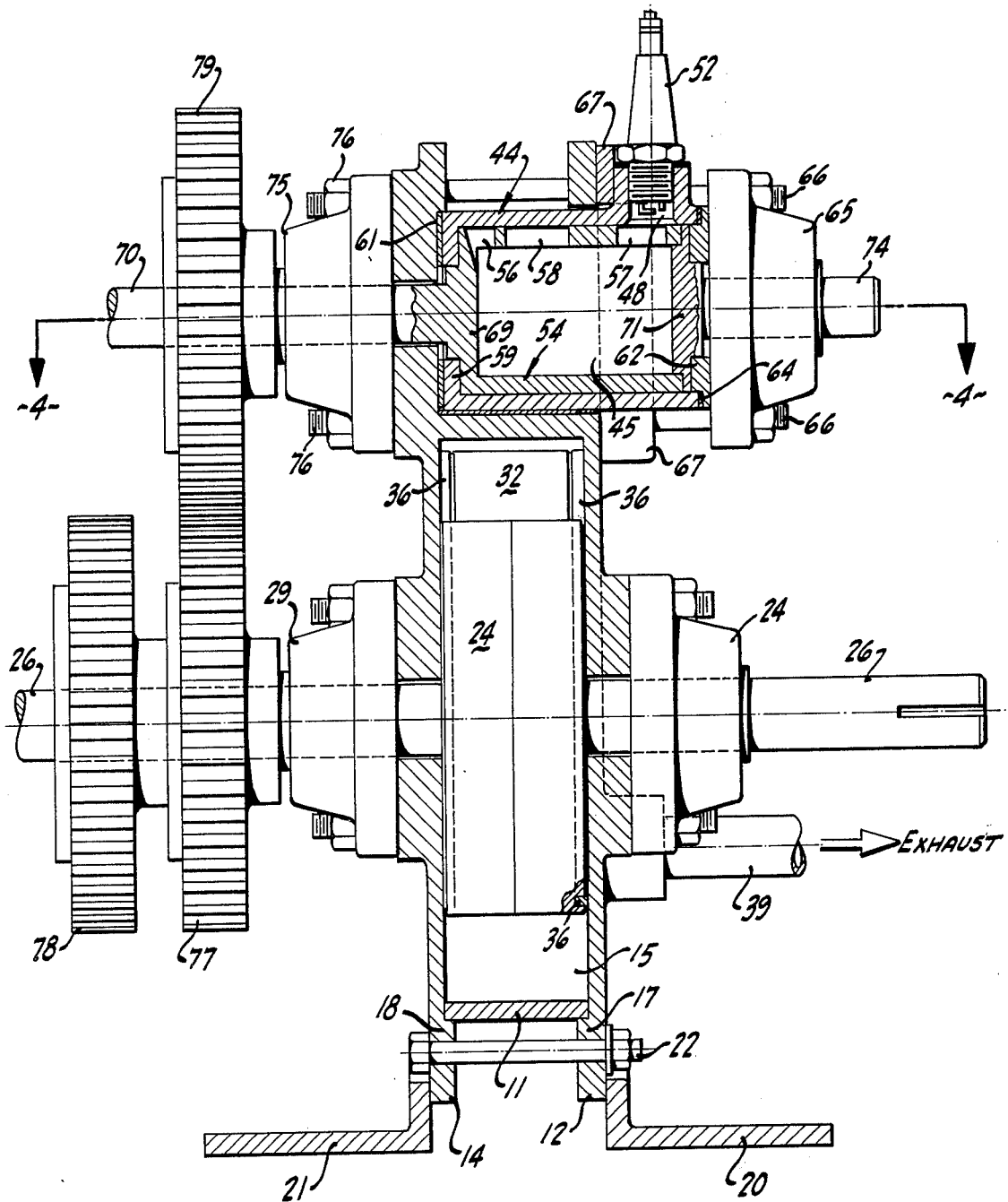
FIG. 3 is a vertical sectional view taken along the line 3—3 of FIG. 2.

The expansion and reaction chambers 15 and 16 intersect along a generally vertical plane, as shown in FIG. 2, and each such cylinder has a large diameter relative to the width or axial length thereof. The cylinders 15 and 16 are respectively equipped with drive and reaction rotors 24 and 25, and such rotors are respectively provided with shafts or axles 26 and 27 journaled for rotation in bearing structures 28,29 and 30,31 carried by the casing plates 12 and 14, as shown best in FIGS. 1 and 3. The bearing structures 28 through 31 may be conventional roller bearing or ball bearing assemblies bolted to the casing plates, as shown, and the rotors 24 and 25 are keyed or otherwise fixedly secured to the respectively associated shafts so as to rotate therewith. The drive rotor 24 has surface areas thereof spaced from the circumjacent walls of the cylinder 15 (i.e., the walls of the associated casing element 11) so as to define an expansion chamber therewith, and in the form shown the rotor 24 is substantially cylindrical so that the expansion chamber is annular.

The drive rotor 24 is equipped with thrust structure extending into leakage-inhibiting relation with the circumjacent walls of the expansion cylinder 15, and such expansion structure provides a pressurizable surface against which a pressure force can act to impart torque to the rotor. In the specific embodiment of the invention being considered, the thrust structure constitutes a vane component 32 extending outwardly from the rotor 24 and, in more specific terms, is radially disposed with respect to the axis of rotation defined by the shaft 26. Any convenient mechanical arrangement may be used to secure the vane 32 in position, and in the form shown, the rotor 24 is segmented through a center plane (see FIG. 3) and the vane extends outwardly through a slot or opening 34 in the rotor, and the sections of the latter are fixedly secured one to another by a plurality of angularly spaced nut-and-bolt fasteners 35. Thus, as the rotor 24 is displaced angularly, the vane 32 sweeps the circumjacent walls of the cylinder 15 in close proximity therewith.

In the usual instance, the relatively close tolerances defining the proximity between the outer surface of the vane 32 and circumjacent walls of the cylinder 15 relative to the rate of rotation of the rotor results in very little leakage, and to further inhibit leakage, the outer edge of the vane 32 may be provided with a plurality of small recesses therealong so as to develop turbulence intermediate the vane and cylinder wall so as to further inhibit leakage. Also, the rotor 24 along each side thereof is equipped with a seal 36 (see FIGS. 2 and 3) so as to establish a low-frictional engagement with the facing walls of the casing plates 12 and 14 so as to minimize fluid leakage. The sealing component 36 may extend along the radial edges of the vane 32, as is most evident in FIG. 3, the same numeral 36 being used to identify the sealing material.

The expansion cylinder 15 is provided with angularly spaced inlet and exhaust openings 37 and 38, the latter of which is shown by phantom lines in FIG. 2 since it does not actually appear in this Figure because it is located in the casing plate 12. In this latter reference, an exhaust conduit 39 (FIG. 3) communicates with the exhaust opening 38 so as to provide a flow path for the spent products of combustion exiting from the expansion chamber 15. The engine apparatus is provided with pressure force reaction structure operative in leakage-inhibiting relation with the drive rotor 24 and, in more particular reference, with the surface areas thereof which are intermediate, at any instant, the inlet and exhaust openings 37 and 38. Such pressure force reaction structure includes the aforementioned reaction rotor 25, and it provides a pressurizable reaction surface against which a pressure force admitted into the expansion cylinder 15 through the inlet opening 37 may react in imparting torque through the drive rotor 24 via the vane 32 thereof.

The reaction rotor 25 has substantially the same diameter as that of the drive rotor 24, and the two rotors are located so that the cylindrical surfaces thereof are in substantially contiguous relation intermediate the inlet and exhaust ports 37 and 38, thereby establishing a seal therebetween. The reaction rotor 25 is provided therealong with a recess or depression 40 of sufficient angular length and radial depth to accommodate the vane 32, as indicated by the phantom positions of these two elements in FIG. 2 showing the vane advancing through the recess. Since the rotors 24 and 25 have the same diameters, it will be evident that a one-to-one ratio of the angular velocities of the rotors accommodates the necessary condition of the vane 32 passing through the recess 40. Other diametral relationships and velocity ratios can be provided, however. The reaction rotor 25 may be provided with sealing components 41 along each surface thereof facing the casing plates 12 and 14, and it is of two-piece construction with the elements thereof secured one to another by a plurality of nut-and-bolt fasteners 42, as explained with respect to the rotor 24. Also, cylinder extension blocks 44 and 45 are located adjacent the mergences of the cylinders 15 and 16 so as to effectively lengthen the walls of the former so as to bring the same into juxtaposition with the cylindrical surface of the reaction rotor 25, as is evident in FIG. 2.

The engine apparatus also has as a part thereof means that includes the inlet opening 37 for cyclically developing within the expansion chamber 15 intermediate the thrust and reaction structures respectively defined for the most part by the vane 32 and cylindrical surface of the rotor 25, in timed relation with the angular displacements of the drive rotor 24, a gaseous pressure charge expansible between the pressurizable surfaces to impart torque to the drive rotor 24. Such means further includes combustion chamber structure 44 of generally cylindrical configuration that defines a combustion chamber 45 therewithin. The combustion chamber structure 44 is operative to confine within the chamber 45 thereof for ignition a combustible admixture of fuel and air for expansion of the products of combustion thereof through the inlet opening 37 into the expansion chamber 15; it being evident that the inlet opening 37 is a composite flow passage formed by registering openings or ports within the casing element 11 and outer cylindrical wall structure of the combustion chamber 44. As shown most clearly in FIGS. 2 and 6, a gasket or sealing element 46 is interposed between the casing 11 and combustion chamber structure 44 so as to enable the intake opening 37 to be pressurized without leakage therefrom.

Referring to FIGS. 5, 6, and 7 in particular, it will be noted that the intake opening 37 is located adjacent the lower portions of the combustion chamber structure 44 and that such structure is further provided with intake and ignition openings 47 and 48 located adjacent the upper portions thereof. The intake and ignition openings 47 and 48 are offset angularly as respects the center-to-center locations thereof, although there is some angular overlap, and they are also offset longitudinally or along the axes of the shafts 26 and 27, as is most evident in FIGS. 3 and 8. The intake opening 47 communicates with an intake passage 49 defined by an intake conduit 50 bolted or otherwise secured to the combustion chamber structure 44 as by means of cap screws 51 (FIGS. 1, 2, and 5). The ignition opening 48 is equipped with a spark ignition device 52 which may be an ordinary spark plug having spaced electrodes across which a spark can be developed to ignite a combustible admixture within the chamber 45.

As previously noted, the engine apparatus may be provided with a conventional ignition circuit (not shown) operative to energize the sparking device 52 in a cyclically repetitive manner at predetermined time instances during operation of the engine apparatus, all as is old and well known in the art. Similarly, conventional systems (not shown) may be used to supply fuel and air to the intake passage 49 for delivery therefrom into the combustion chamber 45 via the intake opening 47. Since no gaseous compression stage occurs within the chamber 45 except that attributable to expansion incident to combustion, air for combustion is delivered under pressure to the intake passage 49 so that it is pressurized to the extent desired upon entering the chamber 45. Also, fuel might be delivered directly into the combustion chamber 45, but in the particular engine apparatus being considered, it is introduced into the compressed air charge by standard fuel injection structure while the charge is within the intake passage 49. Accordingly, the fluid admitted into the combustion chamber 45 via the intake opening 47 constitutes a combustible admixture of fuel and air, which is represented by the directional arrows in FIGS. 5 and 8.

The aforementioned means for cyclically developing a gaseous pressure charge within the expansion cylinder 15 includes, in addition to the combustion chamber structure 44, valve mechanism in flow communication with the inlet opening 37 for cyclically opening and closing the same in timed relation with the angular displacements of the drive rotor 24. In more particular terms, such valve mechanism includes a rotary valve 54 of hollow cylindrical configuration, as shown in FIGS. 3 through 8, rotatably mounted within the combustion chamber 45. In structural terms, the outer diameter of the rotary valve 54 is substantially the same as the inner diameter of the chamber 45 defined by the structure 44 with sufficient clearance to enable the valve to be freely rotatable with respect to the structure 44 while maintaining a relatively fluid tight seal therebetween. As a consequence, the combustion chamber 45 is actually defined substantially in its entirety within the hollow interior of the rotary valve 54 except for the presence of the ports therein which communicate the interior of the valve with the inner wall surfaces of the combustion chamber structure 44 and various openings 37, 47, and 48 therein. As respects such openings, the rotary valve 54 has an inlet port 55, an intake port 56, and an ignition port 57, as shown in FIGS. 4 through 8.

The ports 55, 56, and 57 are spaced apart longitudinally (see FIG. 4) and are angularly spaced as respects the center-to-center locations thereof so as to establish, in relation to the angular dispositions of the combustion chamber openings, the proper timing sequence for the engine apparatus. That is to say, as the rotary valve 54 is continuously rotated, the inlet port 55 successively sweeps past the inlet opening 37 in registration therewith so as to cyclically open the same and similarly, the ports 56 and 57 cyclically sweep the intake and ignition openings 47 and 48 so as to register therewith. The general alignability or registration of the ports 55, 56, and 57 with the openings 37, 47, and 48 is indicated in FIG. 4 in which the positions of such openings are depicted by phantom lines although the openings 47 and 48 are not actually a part of the structural assemblage illustrated in FIG. 4. The inlet port 55 is subdivided into two sections by an intermediate rib or bar 58 which is included essentially for reinforcing or strengthening purposes in view of the substantial arcuate length of the port 55, as is best seen in FIG. 6.

The combustion chamber structure 44, as shown most clearly in FIGS. 1, 3, 4, and 8, is of two piece construction and is supported by the casing plates 12 and 18. In this respect, the structure 44 includes a generally cylindrical component, as previously noted, terminating at one end in an integral closure wall 59 that seats within an annular recess 60 formed in the casing plate 18 and sealing related thereto by a gasket 61. The opposite end of the cylindrical component of the structure 44 is provided with a closure wall 62 sealingly related to the cylindrical component of the structure by a gasket 64. A bearing block assembly 65 confines the closure wall 62 in position by being bolted via nut-equipped studs 66 to a positioning flange 67 bolted to the casing plate 12 (and also to the plate 14) via nut-equipped studs 68. The flange 67 both supports and orients the combustion chamber structure 44 which is supported by the casing plates 12 and 14.

The rotary valve 54 is also of two piece construction and is positioned within the hollow interior of the combustion structure 44 when the end closure wall 62 thereof is removed. Referring especially to FIG. 8, it will be seen that the hollow valve 54 has a cylindrical section formed integrally with an end wall 69 having a shaft or axle section 70 extending longitudinally therefrom in one direction. At its opposite end, the rotary valve is closed by a wall component 71 that is releasably secured to the cylindrical wall of the valve by a plurality of screw fasteners 72, and it is provided with a shaft or axle section 74 effectively constituting a continuation of the shaft section 70 and is coaxially disposed with respect thereto. The shaft section 74 extends through and is journaled for rotation in the aforementioned bearing block assembly 65, as shown best in FIG. 3, and the shaft section 70 extends through and is journaled for rotation in a bearing block assembly 75 secured to the casing plate 18 by a plurality of nut-and-stud fasteners 76. Accordingly, the rotary valve 54 is confined within the combustion chamber structure 44 and is journaled for rotation with respect thereto in the bearing assemblies 65 and 75 which respectively support the shaft sections 74 and 70.

The rotors 24 and 25 and the rotary valve 54 are driven in mechanically enforced synchronism by a gear train that includes a pair of drive gears 77 and 78 that are mounted upon the shaft 26 of the drive rotor 24. The gear 77 meshes with a gear 79 mounted upon the valve shaft section 70 so as to drive the same, and the gear 78 meshes with a gear 80 mounted upon the shaft 27 of the reaction rotor 25. It will be apparent that all of the gears are keyed or otherwise secured to the respectively associated shafts so as to prevent relative rotation therebetween. As a result, rotation of the drive shaft 26 causes the driven shaft 27 and reaction rotor 25 and the shaft section 70 and rotary valve 54 to rotate in mechanically enforced synchronism with the drive rotor 24. As previously explained, the gears 78,80 establish the one-to-one velocity relationship of the rotors 24 and 25, and the gears 77,79 establish a one-to-one velocity ratio for the valve 54 and drive rotor 24. Output power is advantageously taken from the drive shaft 26, and auxiliary equipment including an electric starter may be associated with any of the shafts and especially the shafts 26 and 27. The power takeoff mechanism and auxiliary equipment are not illustrated as they may be conventional and form no part of the present invention.

OPERATION

In ordinary use of the engine apparatus, it will be connected with a load either directly or indirectly (i.e., to a clutch or transmission) depending upon the particular environment. The ignition and fuel-air systems will be energized, and the engine cranked to initiate actuation thereof. Referring to FIGS. 5A through 5D, 6A through 6D, and 7A through 7D in particular, a cycle of operation will be described assuming as the starting condition of the combustion chamber structure 44 and valve mechanism 54 the relative positions thereof shown in FIGS. 5A, 6A, and 7A. In this condition, the intake port 56 has been displaced from registration with the inlet opening 47 and a combustible charge of fuel and air is present within the combustion chamber 45. The inlet opening 37 between the combustion chamber 45 and expansion cylinder 15 is closed by the valve 54, and the ignition port 57 is in substantial registration with the ignition opening 48, wherefore the electrodes of the sparking device 52 are exposed to the combustible admixture within the combustion chamber 45. Accordingly, upon energization of the sparking device, the combustible charge within the combustion chamber is ignited and the mixture begins to burn quite rapidly in the usual manner.

Figure 5A:
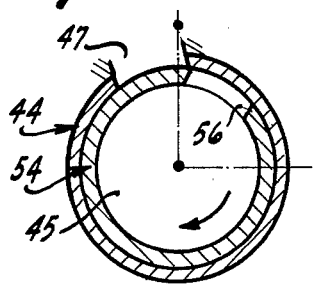
Figure 6A:
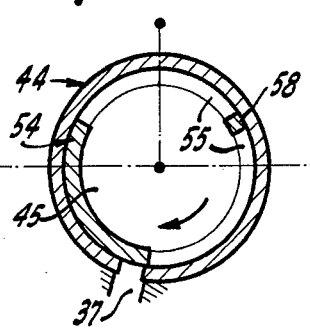
Figure 7A:
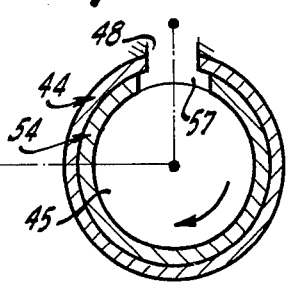
Figure 5B:
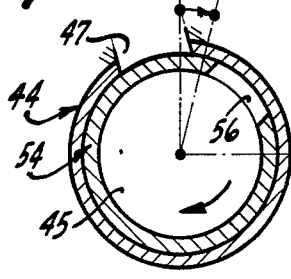
Figure 6B:
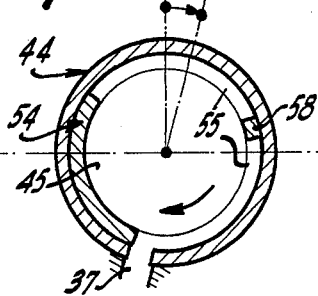
Figure 7B:
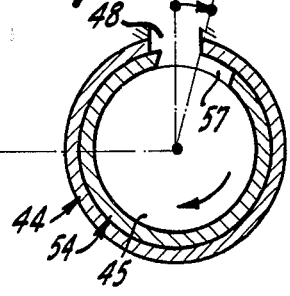

The valve mechanism 54 is in continuous rotation, and as it is displaced in a clockwise direction as viewed in these figures, it is apparent in FIG. 5B that the intake opening 47 remains closed, it is further apparent in FIG. 6B that the inlet opening 37 commences to open because of registration therewith of the inlet port 55, and it is evident in FIG. 7B that the ignition opening 48 is beginning to be closed by displacement of the ignition port 57 from registration therewith. Comparing the second horizontal row of FIGS. 5B, 6B, and 7B with their respective counterparts in the first horizontal row, it may be noted that the rotary valve mechanism 54 has been angularly displaced by approximately 15° as between the positions thereof respectively illustrated in the first and second horizontal rows.

Further rotation of the rotary valve mechanism 54 completely closes the ignition opening 48 and completely uncovers the inlet opening 37, and this condition is maintained for somewhat less than an angular displacement of 270° because of the substantial angular length of the inlet port 55 which approaches, but is somewhat less than, 270°. At the same time, the inlet and ignition openings 47 and 48 are maintained in their closed conditions by the valve mechanism 54, and the expansion of the heated gaseous products of combustion developing within the combustion chamber 54 are expressed therefrom through the inlet opening 37 and into the expansion chamber 15, as illustrated in FIG. 2. At this time, the vane 32 which is being rotated in a counterclockwise direction (as viewed in this Figure) has just traversed the inlet opening 37 so that all of the expanding combustion gases are trapped between the trailing face of the vane and the surface of the reaction rotor 25 which, for purposes of analysis, can be considered a stationary object against which the combustion gases react. As a consequence, the pressure forces developed between the reaction rotor 25 and the trailing surface of the vane 32 impart a torque to the vane effective to rotatably drive the rotor 24.

Power continues to be applied against the vane 32 as more and more combustion products enter the expansion chamber 15 through the inlet opening 37 and expand in pressure-force application to the vane, although the magnitude of the pressure force diminishes as the vane is displaced through a greater angular distance from the inlet 37 and as the combustion continues toward termination.

Figure 5C:
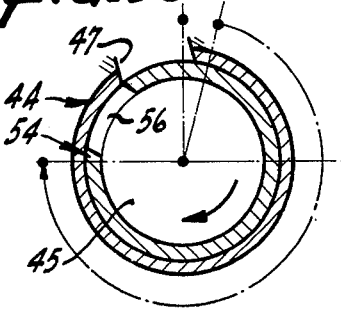
Figure 6C:
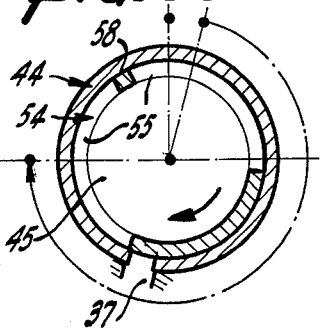
Figure 7C:
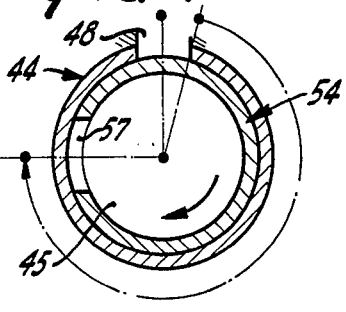

As such condition approaches, the rotary valve mechanism 54 has the approximate position shown in FIGS. 5C, 6C, and 7C wherein all of the openings 37, 47, and 48 are closed, the valve having rotated approximately 270° from the starting position thereof illustrated in FIGS. 5A, 6A, and 7A. At about this same time, the vane 32 will have traversed an arcuate path approximating 270° which will bring it into traversing relation with the exhaust outlet 38, thereby opening substantially all of the expansion chamber 15 to the exhaust outlet. During the following cycle of operation, the expansion chamber will be swept clear of the products of combustion remaining therein from the prior cycle because the entire extent of the expansion chamber intermediate the exhaust outlet 38 and leading face of the vane 32 has the exhaust gases forced therefrom as the vane advances and progressively reduces the volume of such intermediate space toward zero in the vicinity of the exhaust outlet 38.

Figure 5D:
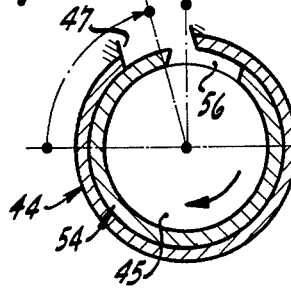
Figure 6D:
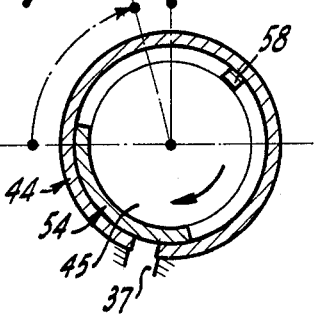
Figure 7D:
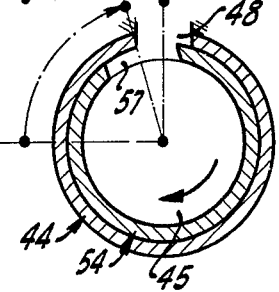

As the rotary valve mechanism 54 advances beyond the position thereof shown in FIGS. 5C, 6C, and 7C, the intake opening 47 is uncovered by progressive registration of the intake port 56 therewith. Such registration of the port and opening 56,47 enables another charge of a combustible admixture of fuel and air to be admitted into the combustion chamber 45. At about the time that the intake opening 47 is being closed by the valve mechanism 54, as shown in FIG. 5D, the ignition opening 48 is about uncovered to its full extent by registration of the port 57 therewith, as shown in FIG. 7D. During the entire charging of the combustion chamber 45, the inlet opening 37 is closed so that there can be no escape of the combustible admixture therethrough from the combustion chamber, and such closure of the inlet opening 37 is maintained until about the instant of ignition, as shown in FIGS. 6A and 7A. Thus, in each 360° rotation of the valve mechanism 54 the combustion chamber 45 is charged, the charge therein is ignited, and the expanding products of combustion are expressed through the inlet opening 37 into the expansion chamber 15 to energize the drive rotor 24. Any residual combustion gases remaining within the chamber 45 following one cycle of combustion are purged by admixture with the next successive incoming charge of fuel and air entering the combustion chamber through the intake opening 47. The fuel and air delivery system will provide a pressurized admixture at the intake opening 47 either continuously or intermittently in timed relation with the rotation of the valve mechanism 54 so that a charge will be present for admission into the combustion chamber whenever the intake port 56 is in registration with the intake opening 47.

As previously explained, the vane 32 purges the expansion chamber 15 following each cycle of operation and during the subsequent cycle, although any residual presence of combustion gases within the chamber 15 is in no sense detrimental since they cannot create back pressure of any significance because of the continuous atmospheric pressure conditions maintained within the chamber 15 in advance of the vane 32 via the exhaust outlet 38. As previously note, the rotors 24 and 25 rotate synchronously so that the vane 32 registers with and passes through the recess 40 as the vane traverses the exhaust outlet 38 and advances toward the inlet opening 37 preparatory to the subsequent cycle of operation, all as is illustrated in FIG. 2 by the various broken-line positions of the vane and recess.

It will be appreciated that the engine apparatus can be made to function more smoothly or uniformly by incorporated flywheel structure such as by mounting one or more flywheels on the drive shaft 26. Additionally, the engine apparatus can be expanded to include a plurality of individual rotor, expansion chamber, combustion chamber structure, and rotary valve mechanisms in a parallel orientation in the manner of any multiple-cylinder internal combustion engines of ordinary design. Conventional type cooling systems (not shown) can be incorporated in the engine apparatus to maintain the temperatures within any suitable limits, although maximizing the temperatures within the expansion chamber 15 is advantageous in that it increases the output torque of the engine.

While in the foregoing specification an embodiment of the invention has been set forth in considerable detail for purposes of making a complete disclosure thereof, it will be apparent to those skilled in the art that numerous changes may be made in such details without departing from the spirit and principles of the invention.

What is claimed is:

1. In a rotary engine a casing defining an expansion cylinder therein provided with angularly spaced inlet and exhaust openings; a drive rotor rotatably mounted within said expansion cylinder and having surface areas spaced from the circumjacent walls thereof to provide an expansion chamber therewith; said drive rotor having thrust structure comprising a single vane component extending outwardly from said rotor into leakage-inhibiting relation with such circumjacent walls of said expansion cylinder and providing a pressurizable surface against which a pressure force can act to impart torque to said rotor; said drive rotor circumjacently secured to a driven shaft to transfer torque developed by said rotor; pressure force reaction structure comprising a reaction cylinder provided by the aforesaid casing and a reaction rotor rotatably mounted within said reaction cylinder, said structure operative in leakage-inhibiting relation with the aforesaid surface areas of said drive rotor intermediate said inlet and exhaust openings and providing a pressurizable reaction surface against which such pressure force reacts in imparting torque to said drive rotor; and means including said inlet opening for cyclically developing within said expansion chamber intermediate said thrust and reaction structures in timed relation with the angular displacements of said drive rotor a gaseous pressure charge expansible between said pressurizable surfaces to impart torque to said drive rotor, the expanded gaseous pressure charge being exhausted directly to the atmosphere through said exhaust opening.

2. The engine apparatus of claim 1 in which said drive rotor is generally cylindrical.

3. The engine of claim 2 in which said vane component is radially disposed with respect to the axis of rotation of said drive rotor.

4. The engine of claim 3 in which said reaction rotor is provided with a vane-receiving recess therealong; and means for rotating said drive and reaction rotors in synchronism to enable said vane component to be received within said recess as said rotors are displaced angularly with respect to each other.

5. The engine of claim 1 in which said means comprises valve mechanism in flow communication with said inlet opening for cyclically opening and closing the same in timed relation with the angular displacements of said drive rotor.

6. The engine of claim 5 in which said valve mechanism includes a rotary valve and gear train interconnecting the same with said drive rotor so as to rotate one with respect to the other in mechanically-enforced synchronism.

7. The engine of claim 5 in which said means further comprises combustion chamber structure operative to confine therewith for ignition a combustible admixture of fuel and air for expansion of the products of combustion thereof through said inlet opening under the control of said valve mechanism.

8. The engine of claim 7 in which said combustion chamber structure is equipped with a spark-ignition device to initiate ignition of a combustible charge confined therewithin.

9. The engine of claim 8 in which said valve mechanism includes a rotary valve and gear train interconnecting the same with said drive rotor so as to rotate one with respect to the other in mechanically-enforced synchronism; said combustion chamber structure defining a generally cylindrical combustion chamber therewithin, and said rotary valve being coaxial with said combustion chamber to control the condition thereof.

10. The engine of claim 9 in which said rotary valve is mounted within said combustion chamber; said combustion chamber being provided with the aforesaid inlet opening communicating with said expansion cylinder, with an intake opening for admitting a combustible admixture of fuel and air into said expansion chamber, and with an ignition opening equipped with a spark ignition device for igniting such combustible admixture of fuel and air within said combustion chamber; said rotary valve being provided with a plurality of ports respectively associated with said inlet, intake, and ignition openings for respectively controlling the same in timed relation with the angular displacements of said drive rotor.

11. The engine of claim 1 in which said means comprises combustion chamber structure operative to confine therewithin for ignition a combustible admixture of fuel and air for expansion of the products of combustion thereof through said inlet opening into said expansion chamber.

12. The engine of claim 11 in which said drive rotor is generally cylindrical.

* * * * *